United States Patent [19]
Fisher et al.

[11] 3,941,260
[45] Mar. 2, 1976

[54] MATERIAL CARRYING VEHICLE

[75] Inventors: Don H. Fisher; Harold Coons; Jackie Highfill, all of Kansas City, Mo.

[73] Assignee: ISCO Manufacturing Company, Inc., Kansas City, Mo.

[22] Filed: Oct. 15, 1974

[21] Appl. No.: 514,799

[52] U.S. Cl. ................................................. 214/82
[51] Int. Cl.² ............................................ B60P 1/00
[58] Field of Search ........................ 298/1 B; 214/82

[56] References Cited
UNITED STATES PATENTS

| | | | |
|---|---|---|---|
| 2,800,234 | 7/1957 | Herpich | 214/82 |
| 3,827,753 | 8/1974 | Pitts | 298/1 B |

FOREIGN PATENTS OR APPLICATIONS

| | | | |
|---|---|---|---|
| 1,275,974 | 10/1961 | France | 298/1 B |

*Primary Examiner*—Robert J. Spar
*Assistant Examiner*—George F. Abraham
*Attorney, Agent, or Firm*—Fishburn, Gold & Litman

[57] ABSTRACT

A material carrying vehicle and an unloading apparatus therefor adapted to carry and unload bulk material, such as dirt, sand, gravel, rock, construction material, debris, and the like wherein the material carrying vehicle includes an elongated mobile body formed as a generally channel shaped simple rugged dump style structure easily varied to be interchangeable with different prime movers. The body structure has laterally spaced wear or guide members mounted on a bottom wall of the body and each positioned adjacent a respective side wall of the body to be engaged by a lower edge of an ejection blade positioned transverse of the body and movable between a forward end and a rear end of the body by laterally spaced extensible members. The ejection blade has walls extending rearwardly therefrom defining spaced extensions each receiving a portion of a respective extensible member therein and having elongated bearing plates engaging the wear or guide members of the body. The extensible members are hydraulically actuated with free floating mounting and the hydraulic system is balanced to extend and retract the extensible members without binding or excessive side loading. The tailgate automatically opens by material moved by the ejection blade in its rearward movement.

10 Claims, 8 Drawing Figures

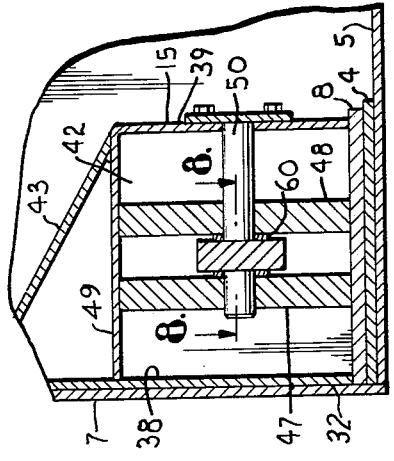
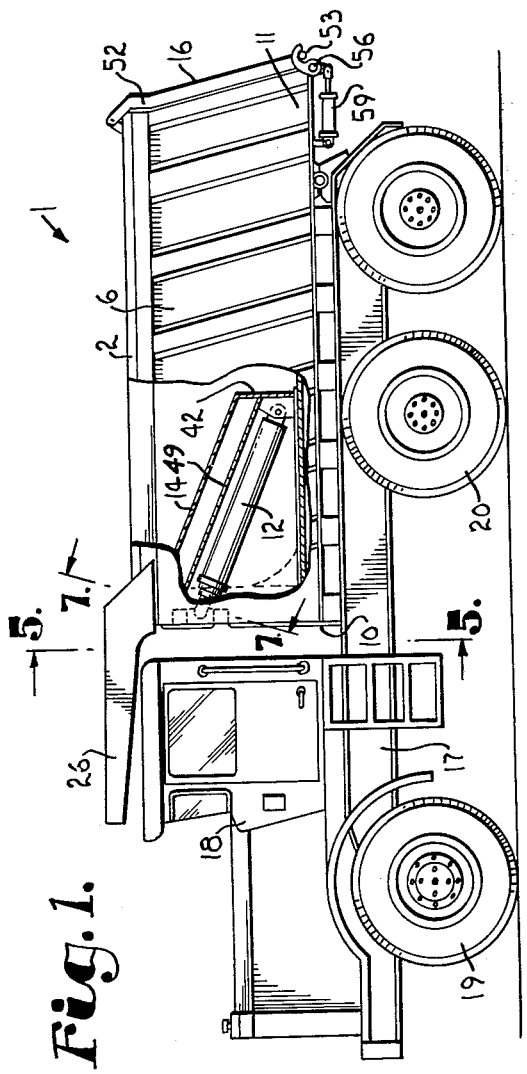
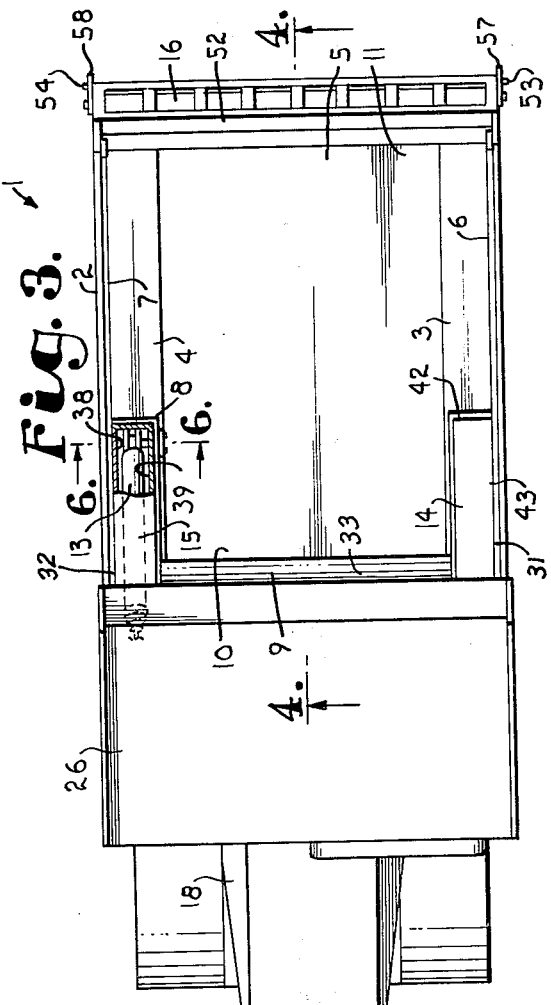
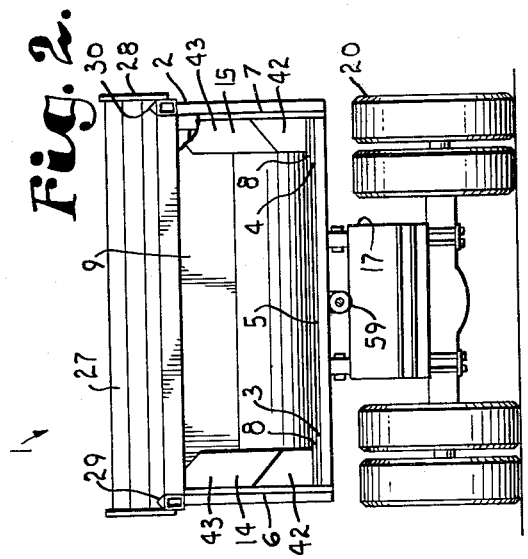

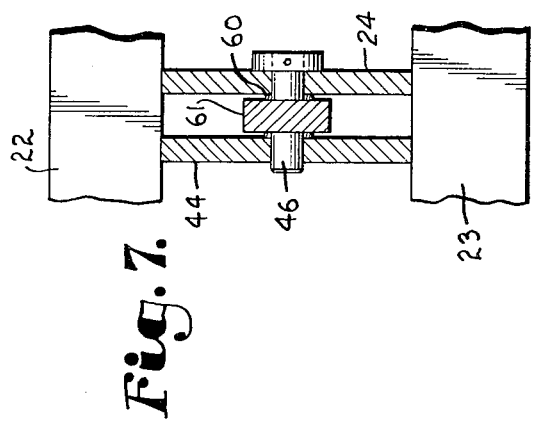
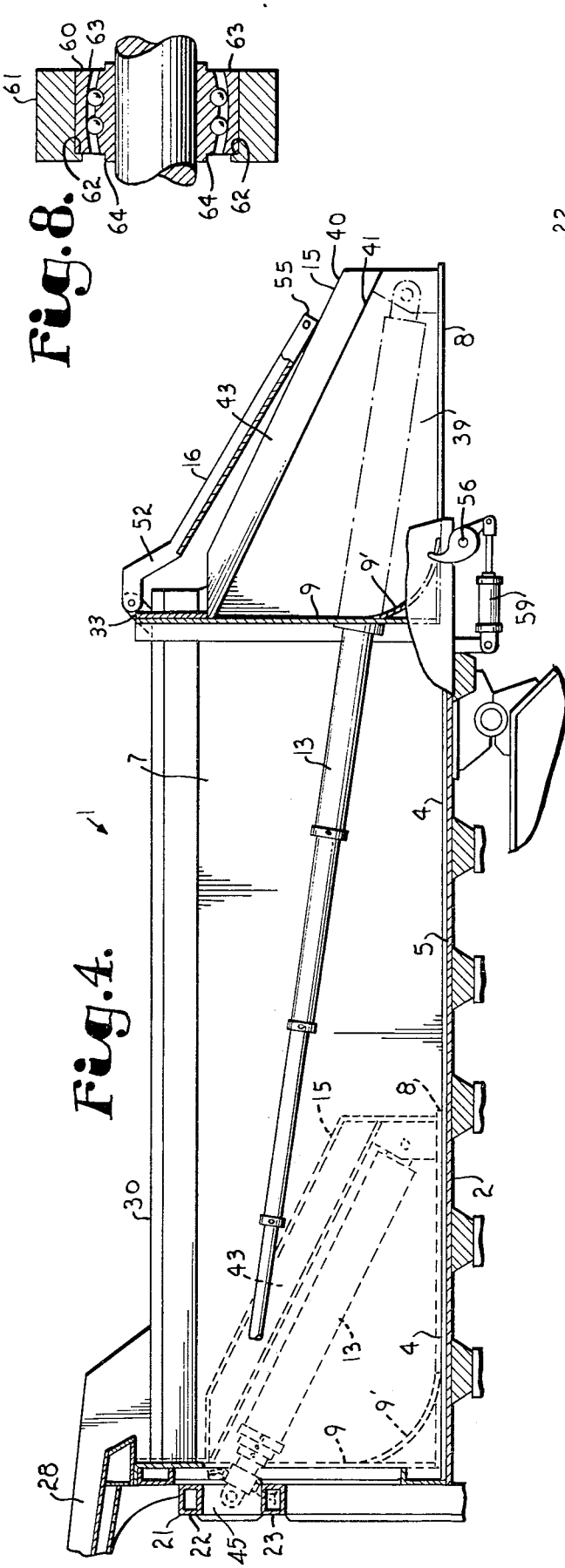
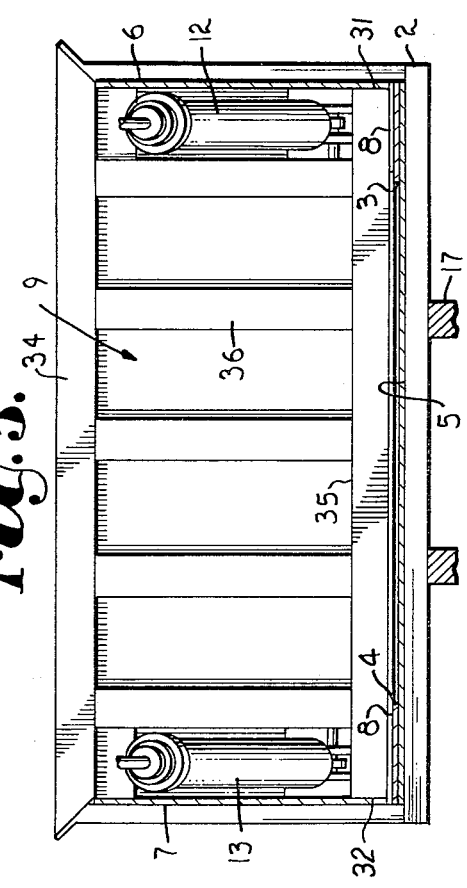

MATERIAL CARRYING VEHICLE

The present invention relates to material carrying vehicles and unloading apparatus therefor and more particularly to such a material carrying vehicle having an ejection blade movable between a forward end and a rear end of a body of the vehicle with the ejection blade having maintained in sliding engagement with a bottom wall of the body during movement toward the rear end of the body and an absence of binding or side loading.

Heretofore, unloading apparatus for material carrying vehicles have employed rollers, guides, cables, chains, and the like to control movement of material moving members and such devices have caused difficulties with the movement of the ejection or material moving members when the respective material enters the guides, pulleys for the cables, and guides for the rollers.

Material carrying vehicles of the type commonly known as dump trucks having an elongated bed or body which is raised to discharge material therefrom are particularly unstable when the supporting vehicle is on a surface other than horizontal and the bed is raised. Such dump trucks, therefore, have a practical upper limit for the length thereof and thereby have a maximum cargo capacity.

The principle objects of the present invention are: to provide a material carrying vehicle and an unloading apparatus therefor particularly adapted to overcome the aforementioned difficulties and characterized by the absence of rollers, pulleys and the like; to provide such a material carrying vehicle and an unloading apparatus therefor adapted to carry and unload bulk material such as a dirt, sand, gravel, rock, construction material, debris and the like; to provide such an unloading apparatus wherein all the components thereof remain within the bed during loading and unloading of the material; to provide such an unloading apparatus which is movable substantially the entire distance between a forward end and a rear end of a body of a material carrying vehicle to effect complete unloading of material from the body; to provide such an unloading apparatus movable within a body having a bottom wall and laterally spaced side walls extending upwardly therefrom to define a material receiving and retaining compartment with surfaces of the side walls in close proximity to respective side edges of an ejection blade during movement of same for ejection of materials from the body; to provide such a material carrying vehicle and unloading apparatus therefor wherein extensible members are connected to a forward portion of the body and to the ejection blade in a manner which maintains sliding engagement between a lower edge of the ejection blade and a bottom wall of the body during movement of the ejection blade towards the rear end of the body; to provide such a material carrying vehicle and unloading apparatus therefor wherein the extensible members have a plurality of telescoping sections each with one end connected to the ejection blade adjacent a lower edge thereof and an other end mounted on a forward portion of the body at a point above the lower edge of the ejection blade in such a manner to avoid excessive columnar bending or shock stress; to provide such a material carrying vehicle having wear members or guide plates mounted in the body for guiding movement of the ejection blade; to provide such an unloading apparatus for material carrying vehicles having a pair of inclined extensible members and controls in a balanced system to operate same at substantially the same rate to maintain the ejection blade transverse of the body without binding against the body, excessive side loading, or other interferences with movement; to provide such an unloading apparatus for material carrying vehicles wherein the ejection blade has a downward pressure thereon to resist riding over material as it is ejected from the bed; to provide such a material carrying vehicle and unloading apparatus therefor wherein a tailgate automatically opens by material moved by the ejection blade in its rearward movement; and to provide such a material carrying vehicle and unloading apparatus therefor which is simple and positive in operation, durable in construction, economical to manufacture, and particularly well adapted for the proposed use.

Other objects and advantages of this invention will become apparent from the following description taken in connection with the accompanying drawings wherein are set forth by way of illustration and example certain embodiments of this invention.

The drawings constitute a part of the specification and include an exemplary embodiment of the present invention and illustrate various objects and features of the material carrying vehicle and unloading apparatus therefor.

FIG. 1 is a side elevational view of a material carrying vehicle with portions broken away to show therein a material unloading apparatus embodying features of the present invention.

FIG. 2 is a rear end elevation of the material carrying vehicle with the unloading apparatus therein and tailgate removed.

FIG. 3 is a top plan view of the material carrying vehicle and material unloading apparatus.

FIG. 4 is an enlarged longitudinal sectional view of the material carrying vehicle and the material unloading apparatus.

FIG. 5 is an enlarged sectional view through the material unloading apparatus and taken on line 5—5, FIG. 1.

FIG. 6 is a further enlarged fragmentary sectional view taken on line 6—6, FIG. 3 and showing the connection of the other end of the extensible member to the material unloading apparatus.

FIG. 7 is also a further enlarged fragmentary sectional view taken on line 7—7, FIG. 1 and showing the connection of one end of an extensible member to the body of the vehicle.

FIG. 8 is an even further enlarged sectional view of the mounting of the ends of the extensible members.

Referring more in detail to the drawings:

As required, detailed embodiments of the present invention are disclosed herein, however it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

In the disclosed embodiment of the present invention, the reference numeral 1 generally designates a material carrying vehicle and an unloading apparatus therefor adapted to carry and unload bulk material such as dirt, sand, gravel, rock, construction material, debris, and the like. The material carrying vehicle 1 includes a generally channel shaped simple rugged dump style structure easily varied to be interchangeable with different prime movers. The material carrying vehicle 1, as illustrated, includes an enlongated mobile body 2 formed as a generally channel shaped structure having laterally spaced bearing or wear members 3 and 4 mounted on a bottom wall 5 of the body 2 to support an ejection blade structure. In the illustrated structure, the members 3 and 4 are each positioned adjacent side walls 6 and 7 respectively of the body 2 and the members 3 and 4 are engaged by bearing members 8 of an ejection blade 9 positioned transverse of the body 2 and movable between a forward end 10 and a rear end 11 of the body 2 by laterally spaced extensible members 12 and 13. The ejection blade 9 has walls extending rearwardly therefrom defining spaced extensions 14 and 15 each of which receive a portion of a respective one of the extensible members therein and the bearing members 8 are connected to the extensions 14 and 15 and engage the wear or bearing members 3 and 4 respectively. The extensible members 12 and 13 are hydraulically actuated with free floating mounting and the hydraulic system is balanced to extend and retract the extensible members 12 and 13 without binding or excessive side loading.

The ejection blade 9 has walls extending rearwardly therefrom and defining compartments 14 and 15 each of which receive a portion of a respective one of the extensible members 12 and 13 therein. Material moved by the ejection blade opens a tailgate 16 and after the material has been discharged the tailgate is supported on the compartments 14 and 15.

The body 2 is a simple rugged dump style body and is such that one body could be interchangeable with different rear dump tractors by changing mounting points on the body. A change of a front end of the body to a gooseneck design would provide one trailer or body interchangeable with different tractors or prime movers. The exemplary embodiment of the invention is shown herein for illustrative purposes to include a frame 17 for supporting the body 2 and an operator's cab 18 and the illustrated vehicle includes front steering wheels 19 and tandum rear dual wheels 20 with the tandum rear wheels 20 being adapted to support at least a major portion of the load of the material in the body 2.

The body is illustrated as a generally channel shaped structure having an open top with the structure being defined by the bottom wall 5 and the side walls 6 and 7. The forward end 10 is substantially open and includes a structural member 21 extending between the side walls 6 and 7 and positioned adjacent the top of the body 2 to thereby provide a substantially rigid body. The illustrated structural member includes upper and lower struts 22 and 23 respectively extending between end members suitably secured to the side walls 6 and 7 respectively, as by welding.

The illustrated body 2 includes a cab protector 26 extending generally forwardly from the structural member 21 and in spaced relation above the operator's cab 18. The illustrated cab protector 26 includes wing portions 27 and 28 suitably secured to upper edges 29 and 30 of the side walls 6 and 7 respectively of the body 2.

The wear or guide members 3 and 4 are laterally spaced and mounted on the bottom wall 5 of the body 2 and in the illustrated structure, the wear or guide members 3 and 4 are positioned adjacent the side walls 6 and 7 respectively of the body 2. The wear or guide members 3 and 4 are illustrated as planar members extending between the forward end 10 and the rear end 11 of the body 2. The wear or guide members 3 and 4 provide a bearing surface engaged by the respective bearing members 8 of the ejection blade 9 which is positioned within the body 2 and has opposite side edges 31 and 32 in close proximity to the side walls 6 and 7 respectively of the body 2. The ejection blade 9 has an upper edge 33 positioned above the upper edges 29 and 30 of the side walls 6 and 7 of the body 2.

The ejector blade 9 is a simple structure riding on the wear or guide members 3 and 4 mounted on the bottom wall 5 at the sides of the body 2. The wear or rub members eliminate the need for rollers, guideways, or other guiding methods found in conventional material ejection equipment. The illustrated ejection blade 9 includes a wall member extending between upper and lower feeding members 34 and 35 respectively. The ejection blade 9 includes a plurality of spaced vertically extending stiffening or bracing members 36 each extending between the upper and lower frame members 34 and 35.

The ejection blade 9 includes wall means extending therefrom and defining the laterally spaced extensions 14 and 15 which are positioned adjacent the side walls 6 and 7 respectively. The extensions 14 and 15 are positioned adjacent the side edges 31 and 32 respectively of the ejection blade 9 and each of the extensions 14 and 15 includes a bottom wall defining the respective bearing member 8 for slidingly engaging a respective one of the wear or guide members 3 and 4.

Each of the extensions 14 and 15 includes laterally spaced side walls 38 and 39 each extending upwardly from respective opposite sides of the respective bottom wall or bearing member 8. The side walls 38 and 39 each have a front end suitably secured to the wall member or portion of the ejection blade 9 and the side walls 38 and 39 each have a rear end spaced rearwardly of the wall member of the ejection blade 9. One of the side walls, for example side wall 38, is positioned in close proximity to and in facing relation with a respective adjacent side wall of the body 2. The side wall 38 of each of the extension 14 and 15 has an upper edge 40 positioned above an upper edge 41 of the other side wall 39. The upper edges 40 and 41 of the side walls 38 and 39 are each inclined downwardly and rearwardly from the ejection blade 9.

The extensions 14 and 15 each include an end wall 42 extending upwardly from the bottom wall or bearing member 8 thereof and the end wall 42 is suitably connected to the rear end of each of the side walls 38 and 39 and to the bottom wall or bearing member 8, as by welding. The end wall 42 of each of the compartments 14 and 15 is engageable with the material in the body 2 and is operative to move same during movement of the ejection blade 9 toward the rear end 11 of the body 2.

The extensions 14 and 15 each include a top wall 43 extending between and connected to the upper edges 40 and 41 of the side walls 38 and 39 respectively and to the end wall 42 and the wall member of the ejection blade 9. The top wall 43 thereby slopes from the upper edge 40 of the side wall 38 to the upper edge 41 of the other side wall 39 and the slope is at an angle to cooperate with the downwardly and rearwardly slope of the top wall 43 such that material being placed on the top wall 43 will flow from the top wall 43 and toward the bottom wall 5 of the body 2.

The ejection blade 9 has laterally spaced openings therein each aligned with a respective one of the extensions of 14 and 15 and the side walls 38 and 39 of each of the extensions 14 and 15 extend rearwardly from the ejection blade 9 whereby each of the extensions 14 and 15 has an open front for receiving a portion of the respective extensible member 12 and 13 therein.

The extensible members 12 and 13 are inclined and positioned adjacent the side walls 6 and 7 of the body 2 and thereby prevent excessive columnar bending or shock stress and the extensible members 12 and 13 each are provided with free floating connections at opposite ends thereof to prevent binding of the ejection blade 9 in the body 2. The extensible members 12 and 13 each have one end thereof connected to the upper strut 22 of the body 2. The extensible members 12 and 13 have the other end thereof received in the extensions 14 and 15 respectively with the other end of the extensible members 12 and 13 being connected to the wall means defining the respective extensions 14 and 15. The opposite ends of the extensible members 12 and 13 are free to move in a manner to avoid excessive columnar bending or shock stress.

The extensible members 12 and 13 each have the upper end thereof formed as a substantially planar member having a suitable aperture therethrough and adapted to receive a spherical bearing therein for a movable connection to the structural member 21. In the illustrated structure, wall members 44 and 45 extend between the upper and lower struts 22 and 23 and are positioned in spaced relation with and adjacent the end members respectively. A suitable pin 46 is mounted in each of the wall members 44 and 45 and the pin 46 extends to the respective adjacent end member 24 for having the upper end of the respective extensible members 12 and 13 mounted thereon. One portion of the spherical bearing is rotatable about the pin 46 and an other portion of the spherical bearing and the upper end of the respective extensible member is freely movable about the one portion of the spherical bearing.

The other end of the extensible members 12 and 13 is similarly connected to the walls defining the extensions 14 and 15 respectively and the other end of the extensible members 12 and 13 is positioned rearwardly of the ejection blade 9 and adjacent the respective bottom wall or bearing member 8 whereby the extensible members 12 and 13 are each inclined to exert a downwardly force on the ejection blade 9. The connection of the upper end of the extensible members 12 and 13 to the structural member 12 and the connection of the lower end to the walls defining the extensions 14 and 15 respectively at a point spaced rearwardly of the ejection blade 9 is such that there is less space between the ejection blade 9 and the upper end of the extensible members 12 and 13 than the length of the extensible members 12 and 13 when in a retracted position with the ejection blade 9 being movable to close the front or forward end 10 of the body 2.

The illustrated connection of the other or lower end of each of the extensible members 12 and 13 to the walls defining the extensions 14 and 15 respectively includes laterally spaced wall members 47 and 48 positioned in each of the extensions 14 and 15. The wall members 47 and 48 are suitably secured to and extend upwardly from the bottom wall or bearing member 8 and are positioned between the side walls 38 and 39 of the respective extensions 14 and 15. A bracing member 49 extends between the side walls 38 and 39 of each of the extensions 14 and 15 and has the wall members 47 and 48 secured thereto. The wall members 47 and 48 have a pin 50 extending therebetween and adapted to extend through a suitable bearing in the other end of the respective extensible members 12 and 13 in a manner similar to the connection of the upper ends thereof to the respective pin 46.

The extensible members 12 and 13 have control means operatively connected thereto and operative to extend and retract the extensible members 12 and 13 at substantially the same rate whereby the ejection blade 9 is maintained in a position substantially transverse of the body 2 during movement of the extensible blade 9 by the extensible members 12 and 13.

The control means are operative to meter hydraulic fluid to the extensible members 12 and 13 in such a manner that the load moved by the blade 9 is substantially the same and in the event of an uneven loading the amount of fluid delivered to the respective extensible members 12 and 13 corresponds to the load to be moved thereby. The hydraulic system is thereby balanced to extend and retract the extensible members 12 and 13 without binding or excessive side loading.

The front or forward end 10 of the body 2 is open except for the structural member 21 and struts 22 and 23 thereof and the extensible members 12 and 13 are adapted to move the ejection blade 9 into a position to effect a closure of the front or forward end 10 of the body 2 when the extensible members 12 and 13 are each in a retracted position and thereby maintain the lower edge of the ejection blade 9 in engagement with the body wall 5 of the body 2 and the bearing member 8 in engagement with the respective wear or guide members 3 and 4.

The tailgate 16 is positioned at the rear end 11 of the body 2 and extends between the side walls 6 and 7 of the body 2. The tailgate 16 has an upper edge 52 substantially coplanar with the upper edges 29 and 30 of the side walls 6 and 7 of the body 2. The tailgate 16 has opposite ends thereof hingedly mounted on the side walls 6 and 7 adjacent the upper edges 29 and 30 respectively thereof.

The tailgate 16 is adapted to be retained in a closed position during transporting the material within the body 2 and is adapted to be opened by the material when the material is being moved toward the rear end 11 of the body 2 and to be engaged by the end wall 42 of each of the compartments 14 and 15 to open the tailgate 16 and maintain same open during movement of the ejection blade 9 toward the rear end 11 of the body 2. The tailgate 16 has pins 53 and 54 extending outwardly from respective opposite ends of the tailgate 16 and adjacent a lower edge 55 of the tailgate 16 for a purpose later described. The body 2 has means mounted thereon and selectively engageable with the tailgate 16 to retain same in a closed position and to permit the tailgate 16 to be moved to an open position.

In the disclosed embodiment, an elongated rod 56 is rotatably supported on the rear end 11 of the body 2, as by a plurality of spaced brackets, and the elongated rod 56 has keeper hooks 57 and 58 on opposite ends thereof and engageable with the pins 53 and 54 respectively extending from the ends of the tailgate 16. An extensible member 59 is operatively connected to the elongated rod 56 to move the hooks 57 and 58 thereon around the pins 53 and 54 respectively to hold the tailgate 16 in a closed position and to move the hooks 57 and 58 out of engagement with the pins 53 and 54 respectively.

In using a material carrying vehicle as illustrated and described, the ejection blade 9 is moved to a position closing the forward end 10 of the body 2. The extensible member 59 is operated to move the hooks 57 and 58 to a position to hold the tailgate 16 in a position closing the rear end 11 of the body 2. The desired bulk material is then placed in the body 2. The vehicle 1 is driven to the desired unloading site and the extensible member 50 is operated to move the hooks 57 and 58 out of engagement with the pins 53 and 54. The extensible members 12 and 13 are operated to move at substantially the same rate thereby moving the ejection blade 9 towards the rear end 11 and moving the side edges 31 and 32 thereof at substantially the same rate. Movement of the extensible members 12 and 13 and the ejection blade 9 moves the bulk material outwardly through the rear end 11 of the body 2 with the tailgate 16 riding on the material as same is being moved out the rear end 11. The rear end wall 42 of each of the compartments 14 and 15 engages the tailgate 16 to thereby maintain same in an open position during ejection of the material from the body 2. During movement of the ejection blade 9, the lower edge of a material moving portion 9' is spaced above in close proximity to the bottom wall 5 of the body 2 and the bottom wall or bearing member 8 of each of the extensions 14 and 15 is moved in sliding engagement with the wear members 3 and 4 respectively.

FIG. 8 illustrates a free floating mounting for each end of the extensible members 12 and 13. A bearing 60 is retained in an end portion 61 of the respective extensible member 12 or 13. The end portion 61 has a shoulder 62 engaged by an outer race 63 and thereby retain same in the end portion 61. The bearing 60 has an inner race 64 mounted on the respective pin 46 or 50 whereby the end portion 61 of the respective extensible member 12 or 13 may move relative to the respective pin 46 or 50 without binding or applying excessive stress to the respective extensible member.

It is to be understood that while we have illustrated and described one form of our invention it is not to be limited to the specific form or arrangement of parts herein described and shown.

What we claim and desire to secure by Letters Patent is:

1. A material carying vehicle comprising:
   a. an elongated mobile body having a forward end and a rear end and having a bottom wall and laterally spaced side walls extending upwardly from the bottom wall to define a generally channel shaped structure having an open top;
   b. first and second laterally spaced elongate wear members mounted on the bottom wall of said body;
   c. an ejection blade within said body and having an upper edge and a lower edge and opposite side edges, said ejection blade being transverse of said body and having each of the side edges thereof in close proximity to a respective one of said side walls of said body;
   d. spaced first and second elongate bearing plates on said ejection blade and each extending longitudinally of and slidingly engaging a respective one of said wear members to movably support said ejection blade with the lower edge thereof in close proximity to said bottom wall of said body; and
   e. first and second laterally spaced extensible members each having one end thereof connected to said body adjacent the forward end thereof in upwardly spaced relation to said bottom wall, said extensible members each having the other end thereof connected to said ejection blade adjacent respective bearing plates thereof with said extensible members being inclined downwardly from the forward end toward said ejection blade, said connections of said extensible members with the body and with the ejection blade being by free floating mounting with the guiding and support of the ejection blade being the bearing plates on the wear members and the connections to the extensible members for an absence of binding in movement of the ejection blade.

2. A material carrying vehicle as set forth in claim 1 wherein:
   a. said body includes a structural member at the forward end thereof and extending between said side walls and positioned adjacent the top of said body;
   b. said structural member has means supporting thereon a first and a second mounting pin;
   c. the one end of each of said extensible members has means engaging a respective one of said pins on said structural member for substantially free movement of said one end of said respective extensible member about said respective pin;
   d. said ejection blade has means adjacent the lower edge thereof supporting a first and a second mounting pin; and
   e. the other end of each of said extensible members has means engaging a respective one of said pins on said ejection blade for substantially free movement of said other end of said respective extensible member about said respective pin whereby said extensible members are each inclined to exert a downward force on said ejection blade.

3. A material carrying vehicle as set forth in claim 1 wherein:
   a. said body includes a structural member at the forward end thereof and extending between said side walls and positioned adjacent the top of said body;
   b. said structural member has means supporting thereon a first and a second mounting pin;
   c. the one end of each of said extensible members has means engaging a respective one of said pins on said structural member for substantially free movement of said one end of said respective extensible member about said respective pin;
   d. said ejection blade has means adjacent the lower edge thereof supporting a first and a second mounting pin;
   e. the other end of each of said extensible members has means engaging a respective one of said pins on said ejection blade for substantially free movement of said other end of said respective extensible member about said respective pin whereby said extensible members are each inclined to exert a downward force on said ejection blade; and
   f. said extensible members each have control means operatively connected thereto and operative to extend and retract each of said extensible members at substantially the same rate whereby said ejection blade is maintained in a position substantially transverse of said body during movement thereof by said extensible members.

4. A material carrying vehicle as set forth in claim 1 wherein:
 a. said elongate wear members are substantially for the length of said bottom wall;
 b. said bearing plates have the major length thereof rearwardly of the ejection blade;
 c. said connection of said other end of the extensible members to the ejector blade being adjacent rear portions of the bearing plates;
 d. said ejector blade having a main portion and rearwardly extending wall portions cooperating with the bearing plates to enclose portions of the extensible members rearwardly of the main portion of the ejector blade.

5. A material carrying vehicle comprising:
 a. an elongated mobile body having a forward end and a rear end and having a bottom wall and laterally spaced side walls extending upwardly from the bottom wall to define a generally channel shaped structure having an open top, said side walls each having an upper edge;
 b. a tailgate positioned at the rear end of said body and sized to close same, said tailgate being mounted to selectively open and close the rear end of said body;
 c. first and second laterally spaced elongate wear members mounted on the bottom wall of said body, said wear members each being positioned adjacent a respective one of said side walls of said body and extending for substantially the length thereof;
 d. an ejection blade with said body and having an upper edge and a lower edge and opposite side edges, said ejection blade being transverse of said body and having each of the side edges thereof in close proximity to a respective one of said side walls of said body, the upper edges of said ejection blade being above the upper edge of each of said side walls of said body;
 e. spaced first and second elongate bearing plates on said ejection blade and each extending longitudinally of and slidingly engaging a respective one of said wear members to movably support said ejection blade with the lower edge thereof in close proximity to said bottom wall of said body, said bearing plates each being positioned adjacent a respective one of the opposite side edges of said ejection blade with the major length of said bearing plates being rearwardly of said ejection blade;
 f. first and second laterally spaced extensible members each having one end thereof connected to said body adjacent the forward end thereof in upwardly spaced relation to said bottom wall, said extensible members each having the other end thereof connected to said ejection blade adjacent respective bearing plates thereof with said extensible members being inclined downwardly from said forward end toward said ejection blade, said connections of said extensible members with the body and with the ejection blade being by free floating mounting with the guiding and support of the ejection blade being the bearing plates on the wear members and the connections to the extensible members for an absence of binding in movement of the ejection blade; and
 g. means mounted on said body and operatively connected to said tailgate for selectively releasing same for movement from a closed position to an open position.

6. A material carrying vehicle as set forth in claim 5 wherein:
 a. said body includes a structural member at the forward end thereof and extending between said side walls and positioned adjacent the top of said body whereby a major portion of the forward end of said body is open;
 b. said structural member has means supporting thereon a first and a second mounting pin;
 c. the one end of each of said extensible members has means engaging a respective one of said pins on said structural member for substantially free movement of said one end of said respective extensible member about said respective pin;
 d. said ejection blade has means adjacent the lower edge thereof supporting a first and a second mounting pin; and
 e. the other end of each of said extensible members has means engaging a respective one of said pins on said ejection blade for substantially free movement of said other end of said respective extensible member about said respective pin whereby said extensible members are each inclined to exert a downward force on said ejection blade.

7. A material carrying vehicle as set forth in claim 5 wherein:
 a. said body includes a structural member at the forward end therefor and extending between said side walls and positioned adjacent the top of said body whereby a major portion of the forward end of said body is open;
 b. said ejection blade is sized to effect a closure of the formed end of said body when said extensible members are each in a retracted position;
 c. said structural member has means supporting thereon a first and a second mounting pin;
 d. the one end of each of said extensible members has means engaging a respective one of said pins on said structural member for substantially free movement of said one end of said respective extensible member about said respective pin;
 e. said ejection blade has means adjacent rear portions of the bearing plates supporting a first and a second mounting pin;
 f. the other end of each of said extensible members has means engaging a respective one of said pins on said ejection blades for substantially free movement of said other end of said respective extensible member about said respective pin;
 g. said ejection blade having rearwardly extending wall portions cooperating with the bearing plates to enclose portions of the extensible members that are rearwardly of said ejection blade.

8. A material carrying device as set forth in claim 7 wherein:
 a. said extensible members each have control means operatively connected thereto and operative to extend and retract each of said extensible members at substantially the same rate whereby said ejection blade is maintained in a position substantially transverse of said body during movement thereof by said extensible members; and
 b. said means for moving said tailgate being operatively connected to said control means for being extensible members in a manner to release said tailgate for opening movement before said extensible members begin to move said ejection blade rearwardly.

9. A material carrying vehicle comprising:
a. an elongated mobile body having a forward end and a rear end and having a bottom wall and laterally spaced side walls extending upwardly from the bottom wall to define a generally channel shaped structure having an open top;
b. first and second laterally spaced wear members mounted on the bottom wall of said body;
c. an ejection blade within said body and having an upper edge and a lower edge and opposite side edges, said ejection blade being transverse of said body and having each of the side edges thereof in close proximity to a respective one of said side walls of said body;
d. spaced first and second bearing plates on said ejection blade and each slidingly engaging a respective one of said wear members to movably support said ejection blade with the lower edge thereof in engagement with said bottom wall of said body;
e. first and second laterally spaced extensible members each having one end thereof connected to said body at the forward end thereof, said extensible members each having the other end thereof connected to said ejection blade, said connections of said extensible members with the body and with the ejection blade being by free floating mounting for an absence of binding in movement of the ejection blade;
f. said body includes a structural member at the forward end thereof and extending between said side walls and positioned adjacent the top of said body;
g. said structural member has means supporting thereon a first and a second mounting pin;
h. the one end of each of said extensible members has means engaging a respective one of said pins on said structural member for substantially free movement of said one end of said respective extensible member about said respective pin;
i. said ejection blade has means adjacent the lower edge thereof supporting a first and a second mounting pin;
j. the other end of each of said extensible members has means engaging a respective one of said pins on said ejection blades for substantially free movement of said other end of said respective extensible member about said respective pin whereby said extensible members are each inclined to exert a downward force on said ejection blade;
k. said means on said ejection blade for supporting the first and second mounting pins comprises first and second extensions;
l. said extensions each comprise:
  1. laterally spaced side walls each extending upwardly from the respective bearing plate of said ejection blade;
  2. an end wall extending upwardly from the respective bearing plate and connected to each of said side walls; and
  3. a top wall extending between and connected to each of said side walls;
m. said ejection blade has laterally spaced openings therein each aligned with a respective one of said extensions; and
n. said side walls of each of said extensions each extend rearwardly from said ejection blade whereby each of said extensions has an open front for receiving a respective one of said extensible members therein.

10. A material carrying vehicle comprising:
a. an elongated mobile body having a forward end and a rear end and having a bottom wall and laterally spaced side walls extending upwardly from the bottom wall to define a generally channel shaped structure having an open top; said side walls each having an upper edge;
b. a tailgate positioned at the rear end of said body and sized to close same, said tailgate being mounted to selectively open and close the rear end of said body;
c. first and second laterally spaced wear members mounted on the bottom wall of said body, said wear members each being positioned adjacent a respective one of said side walls of said body;
d. an ejection blade within said body and having an upper edge and a lower edge and opposite side edges, said ejection blade being transverse of said body and having each of the side edges thereof in close proximity to a respective one of said side walls of said body, the upper edge of said ejection blade being above the upper edge of each of said side walls of said body;
e. spaced first and second bearing plates on said ejection blade and each slidingly engaging a respective one of said wear members to movably support said ejection blade with the lower edge thereof in engagement with said bottom wall of said body, said bearing plates each being positioned adjacent a respective one of the opposite side edges of said ejection blade and extending rearwardly therefrom;
f. first and second laterally spaced extensible members each having one end thereof connected to said body at the forward end thereof, said extensible members each having the other end thereof connected to said ejection blade, said connections of said extensible members with the body and with the ejection blade being by free floating mounting for an absence of binding in movement of the ejection blade;
g. means mounted on said body and operatively connected to said tailgate for selectively moving same between an open position and a closed position;
h. said body includes a structural member at the forward end thereof and extending between said side walls and positioned adjacent the top of said body whereby a major portion of the forward end of said body is open;
i. said structural member has means supporting thereon a first and a second mounting pin;
j. the one end of each of said extensible members has means engaging a respective one of said pins on said structural member for substantially free movement of said one end of said respective extensible member about said respective pin;
k. said ejection blade has means adjacent the lower edge thereof supporting a first and a second mounting pin;
l. the other end of each of said extensible members has means engaging a respective one of said pins on said ejection blade for substantially free movement of said other end of said respective extensible member about said respective pin whereby said extensible members are each inclined to exert a downward force on said ejection blade;
m. said means on said ejection blade for supporting the first and second mounting pins comprises first and second extensions;
n. said extensions each comprise:
1. laterally spaced side walls each extending upwardly from the respective bearing plate of said ejection blade, said side walls each having a rear end and a front end and an upper edge, the front end of each of said side walls being connected to said ejection blade, one of said side walls being in close proximity to and in facing relation with an adjacent side wall of said body, said one side wall having the upper edge thereof above the upper edge of said other side wall;
2. an end wall extending upwardly from the respective bearing plate and connected to each of said side walls; and
3. a top wall extending between and connected to each of said side walls whereby each of said extensions has an open front for receiving said respective extensible member, said top wall sloping from the upper edge of the said extension side walls to the upper edge of the other of said extension side walls;
o. said ejection blade has first and second laterally spaced openings therein each aligned with the open front of a respective one of said extensions; and
p. said side walls of each of said extensions each extend rearwardly from said ejection blade and said respective mounting pin is mounted on said side walls rearwardly of said ejection blade whereby the connections of said extensible members is rearwardly of said ejection blade.

* * * * *